US010790984B1

(12) United States Patent
Stiles

(10) Patent No.: US 10,790,984 B1
(45) Date of Patent: Sep. 29, 2020

(54) PROBABILISTIC SET MEMBERSHIP USING PARTIAL PREFIX MATCHING

(71) Applicant: Altiris, Inc., Tempe, AZ (US)

(72) Inventor: Adam J. Stiles, Altadena, CA (US)

(73) Assignee: ALTIRIS, INC., Tempe, AZ (US)

( * ) Notice: Subject to any disclaimer, the term of this patent is extended or adjusted under 35 U.S.C. 154(b) by 248 days.

(21) Appl. No.: 15/927,323

(22) Filed: Mar. 21, 2018

(51) Int. Cl.
| | | |
|---|---|---|
| *H04L 9/32* | (2006.01) | |
| *G06F 21/31* | (2013.01) | |
| *G06F 21/46* | (2013.01) | |
| *G06F 21/62* | (2013.01) | |
| *H04L 9/14* | (2006.01) | |
| *G06F 21/60* | (2013.01) | |
| *G06F 16/955* | (2019.01) | |
| *G06F 16/22* | (2019.01) | |

(52) U.S. Cl.
CPC ........ *H04L 9/3242* (2013.01); *G06F 16/2255* (2019.01); *G06F 16/955* (2019.01); *G06F 21/31* (2013.01); *G06F 21/46* (2013.01); *G06F 21/602* (2013.01); *G06F 21/6245* (2013.01); *H04L 9/14* (2013.01); *H04L 9/3226* (2013.01)

(58) Field of Classification Search
CPC ....... H04L 9/32; H04L 9/1342; H04L 9/3236; H04L 63/081; H04L 63/1441; G06F 16/2255; G06F 21/60; G06F 21/602; G06F 21/6245; G06F 21/31; G06F 21/46
See application file for complete search history.

(56) References Cited

U.S. PATENT DOCUMENTS

| | | | |
|---|---|---|---|
| 6,959,394 B1 * | 10/2005 | Brickell | G06Q 20/206 380/44 |
| 9,379,896 B1 * | 6/2016 | Altman | H04L 9/3236 |
| 9,503,451 B1 * | 11/2016 | Kane-Parry | H04L 63/083 |
| 9,647,875 B1 * | 5/2017 | Lambert | H04L 41/12 |
| 2019/0007428 A1 * | 1/2019 | Moen | H04L 67/42 |

OTHER PUBLICATIONS

Broder, A. & Mitzenmacher, M., Network Applications of Bloom Filters: A Survey, Internet Mathematics vol. 1, Issue 4 (2004), p. 485-509. (Year: 2004).*

Broder, A. & Mitzenmacher, M, Network Applications of Bloom Filters: A Survey, 2004, Internet Mathematics vol. 1, No. 4, p. 485-509 (Year: 2004).*

(Continued)

*Primary Examiner* — Daniel B Potratz
*Assistant Examiner* — D'Arcy Winston Straub
(74) *Attorney, Agent, or Firm* — Troutman Pepper Hamilton Sanders LLP; James E. Schutz; Mark Lehi Jones

(57) ABSTRACT

A method for user credential location using prefix matching is described. In one embodiment, the method may include enabling a user to generate remotely a cryptographic hash of a user credential of the user, receiving a portion of the cryptographic hash from the user, comparing the portion of the cryptographic hash with a plurality of cryptographic hashes of user credentials stored at a database, determining whether a match exists between the portion of the cryptographic hash and at least one of the plurality of cryptographic hashes, and transmitting a notification to the user indicating whether the user credential is stored at the database based at least in part on a result of the comparing.

20 Claims, 7 Drawing Sheets

(56) References Cited

OTHER PUBLICATIONS

Ali, Junade. "Validating Leaked Passwords with k-Anonymity." Cloudfare Blog, Feb. 21, 2018, https://blog.cloudflare.com/validating-leaked-passwords-with-k-anonymity. Accessed Mar. 21, 2018.
Green, Matthew. "Zero Knowledge Proofs: An Illustrated Primer." Cryptographic Engineering Blog, Nov. 27, 2014-Jan. 21, 2017, https://blog.cryptographyengineering.com/2014/11/27/zero-knowledge-proofs-illustrated-primer. Accessed Mar. 21, 2018.
Safe Browsing Update API (v4); https://developers.google.com/safe-browsing/v4/update-api. Accessed Mar. 21, 2018.

\* cited by examiner

PROBABILISTIC SET MEMBERSHIP USING PARTIAL PREFIX MATCHING

BACKGROUND

Data breaches or leaks often expose large quantities of secure user credentials (e.g., user names and/or passwords). The exposed credentials may result in associated accounts and/or secure information being compromised. Systems may be implemented that allow users to provide potentially-exposed credentials to determine whether the particular credential was subject to a breach or leak. However, providing such credentials may further subject the user's information to additional data breaches or leaks.

SUMMARY

According to at least one embodiment, a method for locating user credentials in databases is described. In one embodiment, the method may include enabling a user to generate remotely a cryptographic hash of a user credential of the user. The user credential may include a user name or a password, or both, associated with the user. In some examples, the method may include receiving a portion of the cryptographic hash from the user. In other examples, the method may include comparing the portion of the cryptographic hash with a plurality of cryptographic hashes of user credentials stored at a database. In some examples, the method may include determining whether a match exists between the portion of the cryptographic hash and at least one of the plurality of cryptographic hashes. Additionally or alternatively, the method may include transmitting a notification to the user indicating whether the user credential is stored at the database based at least in part on a result of the comparing.

In some examples, the method may include determining a false positive error rate based at least in part on determining the portion of the cryptographic hash matches at least one of the plurality of cryptographic hashes and determining a quantity of the plurality of cryptographic hashes stored at the database. The notification may include an indication of the false positive error rate. In other examples, the determined false positive error rate may be based at least in part on a number of bits associated with the portion of the cryptographic hash. Additionally or alternatively, the portion of the cryptographic hash may include a subset of a predetermined maximum number of bits for each cryptographic hash. In other examples, a size or location, or both size and location, of the portion of the cryptographic hash may be selected by the user.

In other examples, the selected portion may include at least one of a beginning portion of the cryptographic hash, a middle portion of the cryptographic hash, or an ending portion of the cryptographic hash, or any combination thereof. Additionally or alternatively, the selected portion may include a non-contiguous portion of bits of the cryptographic hash. In some examples, a size or location, or both size and location(s), of the portion of the cryptographic hash may be selected randomly by a computing device. In other examples, the cryptographic hash and each of the plurality of cryptographic hashes may include at least 128 bits. Additionally or alternatively, only the user may have access to an untruncated version of the cryptographic hash.

A computing device configured for user credential location using prefix matching is also described. The computing device may include one or more processors and memory in electronic communication with the one or more processors. The memory may store computer executable instructions that when executed by the one or more processors cause the one or more processors to perform the steps of enabling a user to generate remotely a cryptographic hash of a user credential of the user. In some examples, the user credential may include a user name or a password, or both, associated with the user. In other examples, the memory may store computer executable instructions that when executed by the one or more processors cause the one or more processors to perform the steps of receiving a portion of the cryptographic hash from the user. In other examples, the memory may store computer executable instructions that when executed by the one or more processors cause the one or more processors to perform the steps of comparing the portion of the cryptographic hash with a plurality of cryptographic hashes of user credentials stored at a database.

In some examples, the memory may store computer executable instructions that when executed by the one or more processors cause the one or more processors to perform the steps of determining whether a match exists between the portion of the cryptographic hash and at least one of the plurality of cryptographic hashes. Additionally or alternatively, the memory may store computer executable instructions that when executed by the one or more processors cause the one or more processors to perform the steps of transmitting a notification to the user indicating whether the user credential is stored at the database based at least in part on a result of the comparing.

A computer-program product for user credential location using prefix matching is also described. The computer-program product may include a non-transitory computer-readable medium storing instructions thereon. When the instructions are executed by one or more processors, the execution of the instructions may cause the one or more processors to perform the steps of enabling a user to generate remotely a cryptographic hash of a user credential of the user. In some cases, the user credential may include a user name or a password, or both, associated with the user. In some examples, the execution of the instructions may cause the one or more processors to perform the steps of receiving a portion of the cryptographic hash from the user. In other examples, the execution of the instructions may cause the one or more processors to perform the steps of comparing the portion of the cryptographic hash with a plurality of cryptographic hashes of user credentials stored at a database.

In some examples, the execution of the instructions may cause the one or more processors to perform the steps of determining whether a match exists between the portion of the cryptographic hash and at least one of the plurality of cryptographic hashes. Additionally or alternatively, the execution of the instructions may cause the one or more processors to perform the steps of transmitting a notification to the user indicating whether the user credential is stored at the database based at least in part on a result of the comparing.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
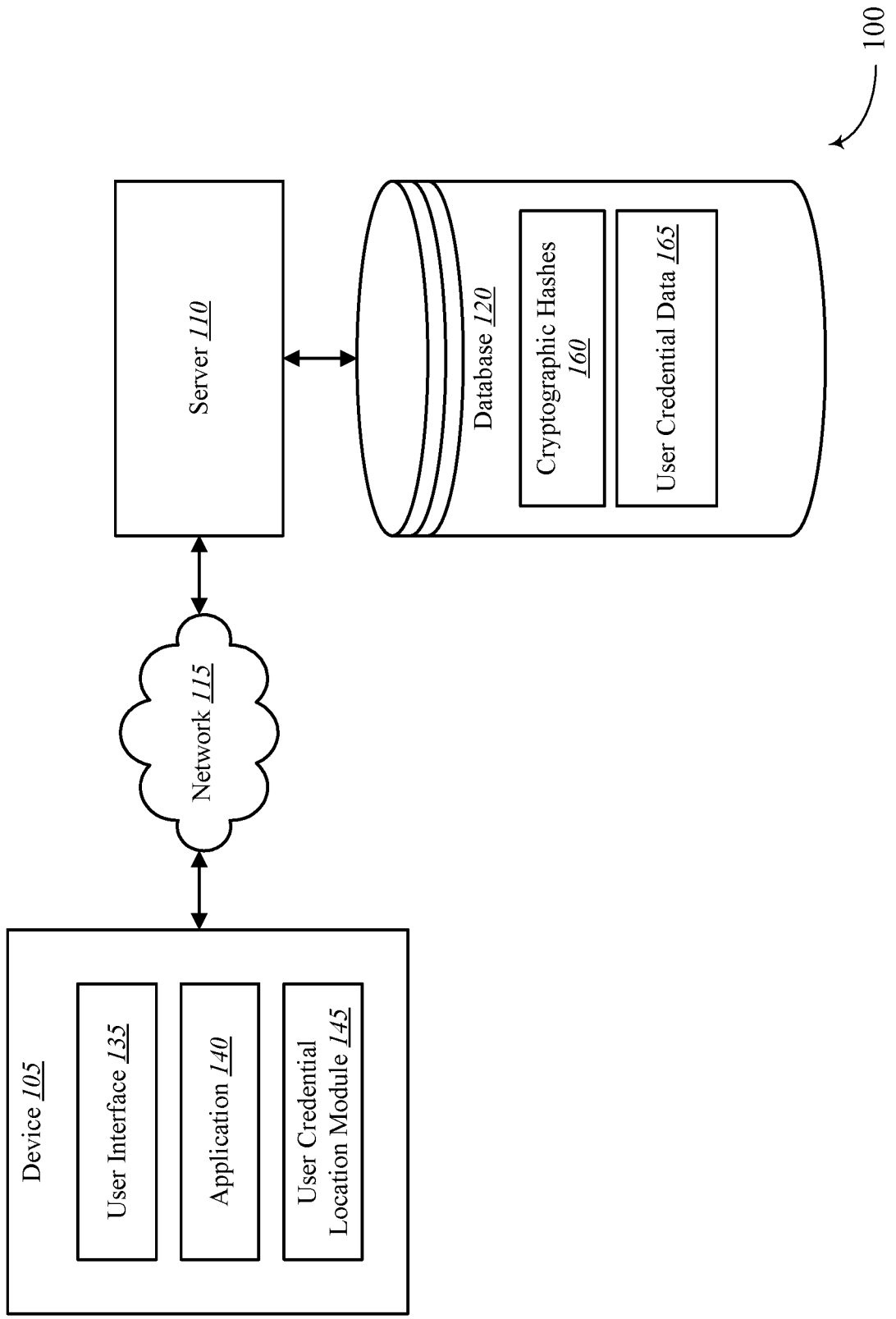
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to user credential location. More specifically, the systems and methods described herein relate to allowing users to securely locate user credentials stored at a database by generating a cryptographic hash associated with a particular user-defined credential.

Often times, credit and fraud prevention entities maintain large databases of credential pairs (e.g., a user name and a password) that have been the object of data breaches or leaks. Such entities' clients desire to protect their consumers by verifying that the credentials consumers use to access enterprise services haven't been previously included in a known data breach or leak. In order to determine whether particular credentials have been subject to a data breach or leak, enterprises generate a credential pair signature and submit that to a credit and fraud prevention web service. The web service returns a value indicating whether that credential pair signature exists in the breach dataset.

One way to generate a signature is to use a cryptographic hash. For example, one might use credential pair "SHA256" (e.g., a user name and password). Thus, in one example, the output of the generated cryptographic hash function may be a 256-bit value. In other examples, the hash may be 128-bits or greater. Some clients have ex-pressed privacy concerns about querying the credit and fraud prevention entity's dataset via this 256-bit signature. Cryptographic hash values are not reversible (e.g., you can't use the hash value to calculate the input). However, some clients are concerned that an entity may keep a log of queried signatures and potentially use rainbow tables or other mechanism to determine the original input. Thus some clients may prefer an approach that limits the data exposed to such entities through the query interface, insomuch as they are willing to accept a probabilistic result.

The solution presented herein is unique in that it gives a probabilistic determination of set membership (e.g., whether a given number exists in a set of large numbers) by querying based only on a portion of the target number (e.g., a prefix). The set membership probability may be included in query responses. A false positive (FP) rate may be based at least in part on the size of the population of entries being queried and/or features of the prefix. In some cases, the FP rate may be based at least in part on the signature size. In some cases, the present systems and methods may query to determine what prefix length will provide a certain fixed FP rate.

The invention described herein may be composed of a database of keys and logic for interacting with those keys. The keys may be unique within the set. Such an implementation may use a 256-bit key, for example. The keys may be sorted in binary order to improve the speed of lookups via a binary search algorithm. In some examples, the keys may be randomly distributed within the key space.

The invention described herein may include a web service that pro-vides an application programming interface (API) for clients to use. The invention may allow clients to query whether a specific key is present in the dataset. Through mutual agreement, clients may generate a key and truncate it at a specific length and submit that key for matching. For example, a user might submit the first 96 bits of a 256-bit key. In some cases, the user may select the truncated length and/or select a location of the prefix bits. As one example, a user may select a first portion of bits towards a start of the 256-bit key, a second portion of bits towards the middle of the 256-bit key, and/or third portion of bits towards the end of the 256-bit key.

In one embodiment, the web service may find any full-length keys in a database that match the prefix submitted. If a match is found, the service may return an indication of the match and a probability that the match represents a true positive and/or a false positive. In some cases, the service may not return false negative results. The false positive rate may be tuned by changing the length of the submitted key prefix. When a user prefers a lower false positive rate, the user may submit a longer key prefix.

As one example, a dataset of approximately 10 billion credential pairs that have been previously breached may be queried. In the example, the database may store a signature of each credential pair calculated as a cryptographic hash of a user name and password. In this example, the signatures may be randomly distributed in a 256-bit key space. To query the dataset, the present systems and methods may generate a credential signature using the same method (e.g., a cryptographic hash of a user name and password). Next, the present systems and methods may calculate a signature prefix by truncating the hash value to return the first 96-bits. That 96-bit value may be submitted to the API in place of the full 256-bit cryptographic hash. The present systems and methods may perform a search for any 256-bit signatures in the dataset that share the first 96-bits. If a match is found, then the service may return a positive indicator. If no match is found, then the service may return a negative indicator. However, when a match is found, the system may calculate the probability that a false positive has occurred using the formula $p=m/2^k$, where k=96 (size of prefix in bits), m=10,000,000,000 (size of the dataset being searched). In this example p=1.26e-19, indicating a low probability that a false positive has occurred.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, and a network 115 that allows the device 105, the server 110, and the database 120 to communicate with one another. In other examples, the environment 100 may include a remote device (e.g., a remote computing device; not shown) in communication with device 105

Examples of the device 105 may include any combination of mobile devices, smart phones, personal computing devices, computers, laptops, desktops, servers, media content set top boxes, or any combination thereof. In some cases, device 105 may include a user credential location module 145 integrated within device 105, or may be in communication with a user credential location module via network 115. In some examples, device 105 may be in communication with a remote device (e.g., a remote computing device; not shown).

Examples of a remote device (e.g., a remote computing device) may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. In some examples, a remote computing device may connect to device 105 via network 115. In other examples, a remote computing device may connect directly to device 105. In some cases, device 105 may connect or attach to a remote computing device and/or server 110 via a wired and/or wireless connection. In some cases, device 105 may attach to any combination of a port, socket, and slot of computing device 150 and/or server 110.

In some configurations, the device 105 may include a user interface 135, application 140, and user credential location module 145. Although the components of the device 105 are depicted as being internal to the device 105, it is understood that one or more of the components may be external to the device 105 and connect to device 105 through wired and/or wireless connections. In some embodiments, application 140 may be installed on a computing device (e.g., a remote computing device; not shown) in order to allow a user to interface with a function of device 105, user credential location module 145, computing device 150, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include user credential location module 145. For example, device 105 may include application 140 that allows device 105 to interface with a separate device via user credential location module 145 located on another device such as a remote computing device (not shown) and/or server 110. In some embodiments, device 105, remote computing device, and server 110 may include user credential location module 145 where at least a portion of the functions of user credential location module 145 are performed separately and/or concurrently on device 105, remote computing device, and/or server 110. Likewise, in some embodiments, a user may access the functions of device 105 (directly or through device 105 via user credential location module 145) from a remote computing device. For example, in some embodiments, a remote computing device may include a mobile application that interfaces with one or more functions of device 105, user credential location module 145, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly a remote computing device (not shown) and/or one or more network devices such as a gateway, switch, router, intrusion detection system, etc. Database 120 may include a plurality of cryptographic hashes 160 and user credential data 165. In some examples, each of the plurality of cryptographic hashes 160 may be associated with one or more user credential data entries 165.

As one example, device 105 (e.g., user credential location module 145) may determine whether particular user data is stored at database 120 (e.g., as part of user credential data 165) over network 115 via server 110.

As described above, user credential location module 145 may enable a user to determine whether particular user data is stored at database 120. In some embodiments, user credential location module 145 may be configured to perform the systems and methods described herein in conjunction with user interface 135 and application 140. User interface 135 may enable a user to interact with, control, and/or program one or more functions of user credential location module 145. Further details regarding the user credential location module 145 are discussed below.

Figure 2:
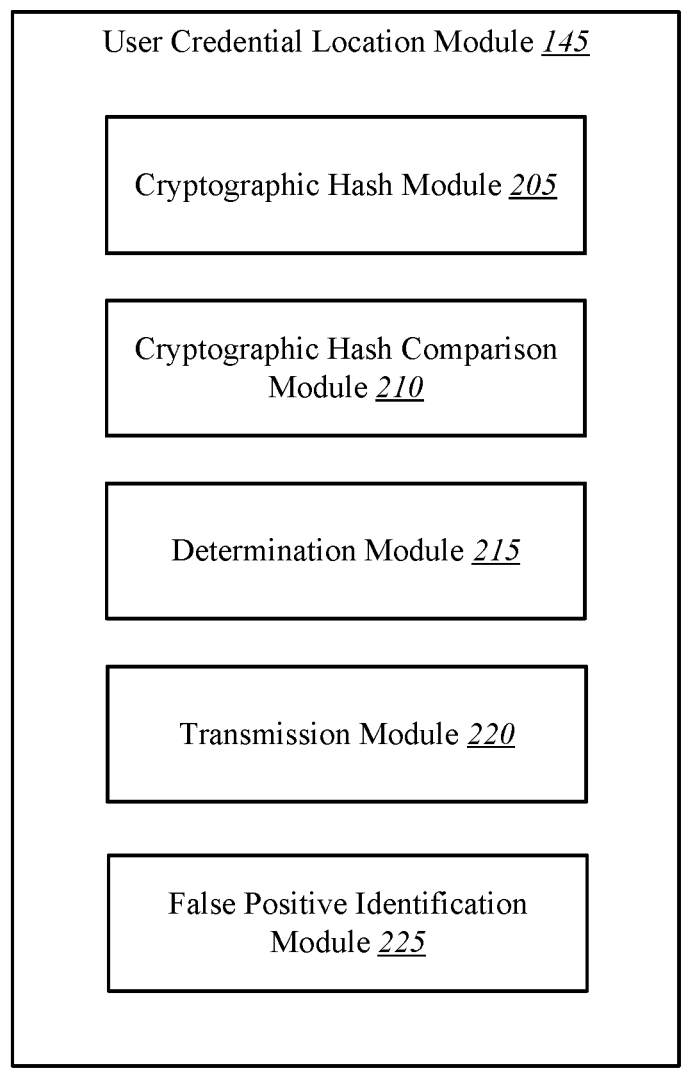
FIG. 2 is a block diagram illustrating one example of a user credential location module.

FIG. 2 is a block diagram illustrating one example of user credential location module 145. User credential location module 145 may be one example of user credential location module 145 depicted in FIG. 1. As depicted, user credential location module 145 may include cryptographic hash module 205, cryptographic hash comparison module 210, determination module 215, transmission module 220, and false positive identification module 225.

The cryptographic hash module 205 may receive, from a remote device (e.g., from a remote computing device), a cryptographic hash of a user credential of the user. In other examples, the cryptographic hash module 205 may generate a cryptographic hash of a user credential of the user. For example, the cryptographic hash may include a user name, a password, or both, associated with the user. In the event that the cryptographic hash is received (e.g., from a remote computing device), the cryptographic hash module 205 may truncate the cryptographic hash. Stated another way, the cryptographic hash module 205 may determine a portion of the cryptographic hash for use in subsequent operations. Thus, in some examples, the cryptographic hash module 205 may determine that a portion of the cryptographic hash includes a subset of a predetermined maximum number of bits (e.g., at least 128-bits).

In other examples a user may indicate to cryptographic hash module 205 (e.g., via user interface 135 as described with reference to FIG. 1) a size or location, or both size and location, of the portion of the cryptographic hash. In some embodiments, cryptographic hash module 205 may select the size and/or location of the portion of the cryptographic hash. In some cases, cryptographic hash module 205 may select the portion from two or more locations of the cryptographic hash. In other examples, the selected portion may include at least one of a beginning portion of the cryptographic hash, a middle portion of the cryptographic hash, or an ending portion of the cryptographic hash, or any combination thereof. Additionally or alternatively, the selected portion may include a non-contiguous portion of bits of the cryptographic hash.

The cryptographic hash comparison module 210 may compare the portion of the cryptographic hash with a plurality of cryptographic hashes of user credentials stored at a database. As described above with reference to FIG. 1, database 120 may include user credential data 165 that includes a plurality of cryptographic hashes 160. Thus, in some examples, the cryptographic hash comparison module 210 may compare the portion of the cryptographic hash with each of the plurality of cryptographic hashes 160 stored at database 120.

The determination module 215 may determine whether a match exists between the portion of the cryptographic hash and at least one of the plurality of cryptographic hashes (e.g., the plurality of cryptographic hashes 160 as described with reference to FIG. 1). In some examples, the determination may be made based in part on a portion of the cryptographic hash matching at least a portion of one or more of the plurality of cryptographic hashes.

The transmission module 220 may transmitting a notification to the user indicating whether the user credential is stored at the database based at least in part on a result of the comparing (e.g., by cryptographic hash comparison module 210). For example, one of cryptographic hash comparison module 210 and/or determination module 215 may indicate that the cryptographic hash matches one or more of the plurality of cryptographic hashes (e.g., the plurality of cryptographic hashes 160 as described with reference to FIG. 1). Thus, the transmission module 220 may transmit such a positive indication to a user. Additionally or alternatively, one of cryptographic hash comparison module 210 and/or determination module 215 may indicate that the cryptographic hash does not match any of the plurality of cryptographic hashes (e.g., the plurality of cryptographic hashes 160 as described with reference to FIG. 1). Accordingly, the transmission module 220 may transmit such a negative indication to a user.

In some examples, false positive identification module 225 may determine a false positive error rate based at least in part on determining the portion of the cryptographic hash matches at least one of the plurality of cryptographic hashes (e.g., by determination module 215) and determining a quantity of the plurality of cryptographic hashes stored at the database. In some examples, the notification (e.g., transmitted by transmission module 220) includes an indication of the false positive error rate. In other examples, the determined false positive error rate may be based at least in part on a number of bits associated with the portion of the cryptographic hash.

Figure 3:
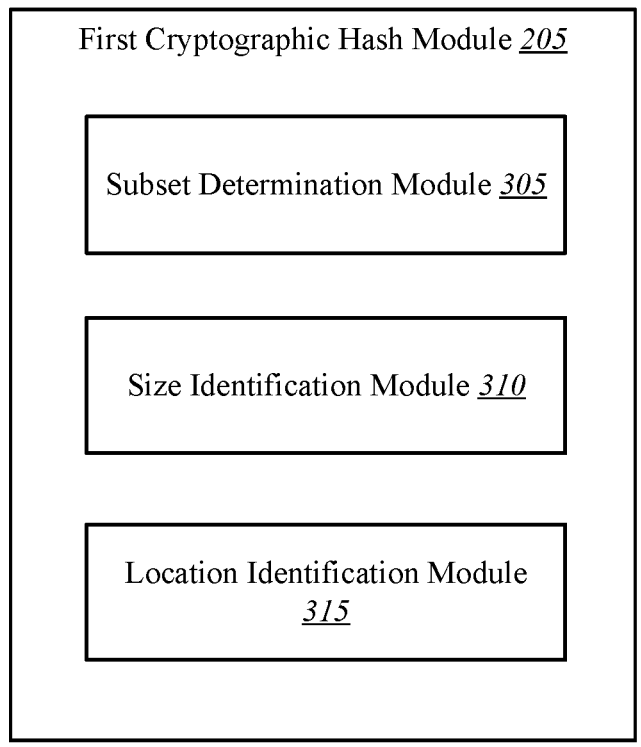
FIG. 3 is a block diagram illustrating one example of a cryptographic hash comparison module.

FIG. 3 is a block diagram illustrating one example of cryptographic hash module 205. Cryptographic hash module 205 may be one example of cryptographic hash module 205 as depicted in FIG. 2. As depicted, cryptographic hash module 205 may include a subset determination module 305, a size identification module 310, and a location identification module 315.

In some examples, the cryptographic hash described above with reference to FIG. 2 may include a subset of a predetermined maximum number of bits. Accordingly, the subset determination module 305 may determine a subset of the predetermined maximum number of bits. For example, subset determination module 305 may first determine that a predetermined maximum number of bits is 256 bits. Subsequently, subset determination module 305 may determine that a subset of the predetermined maximum number of bits is, for example, 512 bits. In other examples, subset determination module 305 may determine that a predetermined maximum number of bits is 128 bits. Subsequently, in such an example, subset determination module 305 may determine that a subset of the predetermined maximum number of bits is, for example, 96 bits.

In some examples, the size identification module 310 may receive an indication of a size of the portion of the cryptographic hash from a user (e.g., of device 105 as discussed with reference to FIG. 1). In other examples, the size identification module 310 may randomly select a size of the cryptographic hash. For example, a size of the portion of the cryptographic hash may be 128-bits. For example, subset determination module 305 may first determine that a predetermined maximum number of bits is 256 bits. Subsequently, a user may indicate a size of the portion of the cryptographic hash. The user may select the size to be, for example, 128 bits. In other examples, subset determination module 305 may determine that a predetermined maximum number of bits is 128 bits. Subsequently, a user may indicate a size of the portion of the cryptographic hash. The user may select the size to be, for example, 96 bits. In other examples, as described above, the size of the portion of the cryptographic hash may be identified randomly (e.g., by size identification module 310).

In some examples, the location identification module 315 may receive an indication of at least one location of the portion of the cryptographic hash from a user (e.g., of device 105 as discussed with reference to FIG. 1). In other examples, the location identification module 315 may randomly select at least one location of the cryptographic hash. For example, the user-selected or randomly-selected portion may be or may include at least one of a beginning portion of the cryptographic hash, a middle portion of the cryptographic hash, or an ending portion of the cryptographic hash, or any combination thereof. For example, a user may indicate a beginning portion of the cryptographic hash and that the size of the portion is to be 128 bits. Thus the beginning 128 bits of the cryptographic hash may be used in determining whether a match exists between the portion of the cryptographic hash and at least one of the plurality of cryptographic hashes (e.g., stored at database 120 as described with reference to FIG.).

In other examples, the portion identified by location identification module 315 may include one or more non-contiguous portions of bits of the cryptographic hash. For example, a user may indicate that the size of the portion is to be 128 bits. For instance, some of the 128 bits may be from a beginning portion, some of the 128 bits may be from a middle portion, and/or some of the 128 bits may be from an ending portion of the full-length cryptographic hash. Thus any combination of 128 bits of the cryptographic hash may be used in determining whether a match exists between the portion of the cryptographic hash and at least one of the plurality of cryptographic hashes.

Figure 4:
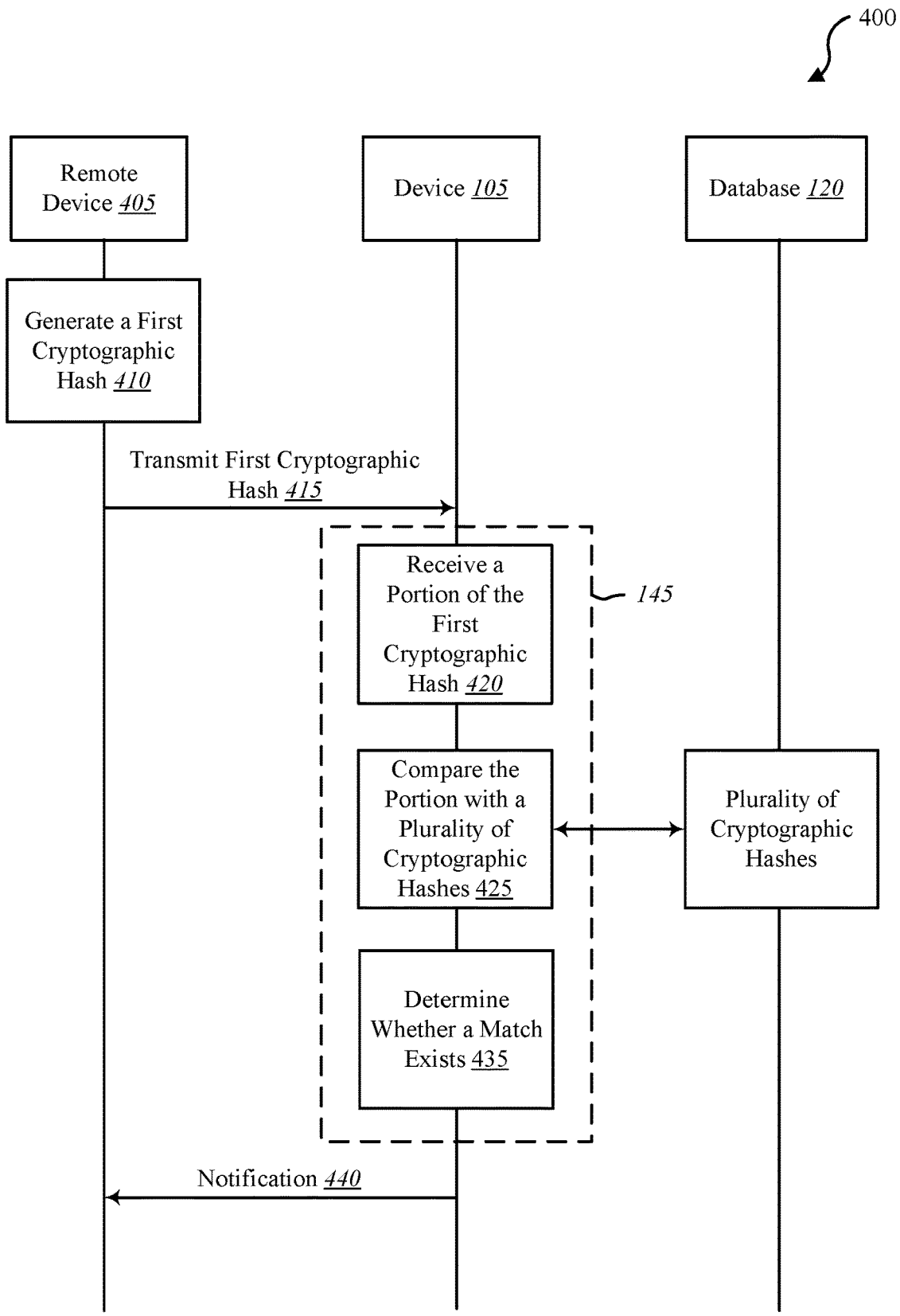
FIG. 4 is a flow diagram illustrating one embodiment of a method in accordance with various aspects of this disclosure.

FIG. 4 is a flow diagram illustrating one embodiment of a method 400 for user credential location using prefix matching. In some configurations, the method 400 may be implemented by a remote device 405, device 105, and database 120. In some examples, device 105 may be an example of device 105 as described with respect to FIG. 1, and database 120 may be an example of database 120 as described with respect to FIG. 1. In some configurations, the method 400 may be implemented in conjunction with server 110, network 115, components thereof, or any combination thereof.

In some examples, remote device 405 may be referred to as a user device and may be associated with a user seeking to locate user credentials stored at database 120. At block 410, remote device 405 may generate a cryptographic hash of a user credential of the user. In some examples, remote device 405 may prompt a user for one or more credentials to generate the cryptographic hash. For example, remote device 405 may prompt a user for at least one of a user name or a password. Thus, the cryptographic hash may include a user name, a password, or both associated with the user of remote device 405.

At step 415, remote device 405 may transmit the generated cryptographic hash to device 105. As described above, device 105 may be an example of device 105 as described with reference to FIG. 1 and may include a user credential location module 145 (as described with reference to FIGS. 1 and 2). At block 420, device 105 may receive a portion of the cryptographic hash from the remote device 405. In some examples, remote device 405 may transmit only a portion of the cryptographic hash to device 105. In other examples, device 10 105 may receive the entire cryptographic hash from the remote device 405, and may subsequently determine a portion (e.g., a subset of a predetermined maximum number of bits) of the cryptographic hash.

At block 425, device 105 may compare the portion of the cryptographic hash with a plurality of cryptographic hashes (e.g., cryptographic hashes 160 as described with reference to FIG. 1) stored at database 120. In some examples, the comparison may be based in part on a particular size or location of the cryptographic hash matching one of the plurality of cryptographic hashes stored at database 120. For example, a user may indicate that he or she wishes to compare the first 128 bits of a 256-bit cryptographic hash. Thus, at block 425, device 105 may compare the first 128 bits of the cryptographic hash to the first 128 bits of each of the plurality of cryptographic hashes stored at database 120. At block 435, 105 may determine whether a match exists between the cryptographic hash and any of the plurality of cryptographic hashes stored at database 120. In some examples, the steps described at blocks 420, 425, and 435 may be carried out by a user credential location module 145, 145 as described with reference to FIGS. 1 and 2. In other examples, at step 440, the user device 105 may transmit a notification to the remote device 405. The notification may indicate whether or not a match was determined (e.g., whether the cryptographic hash matched any of the plurality of cryptographic hashes stored at database 120).

Figure 5:
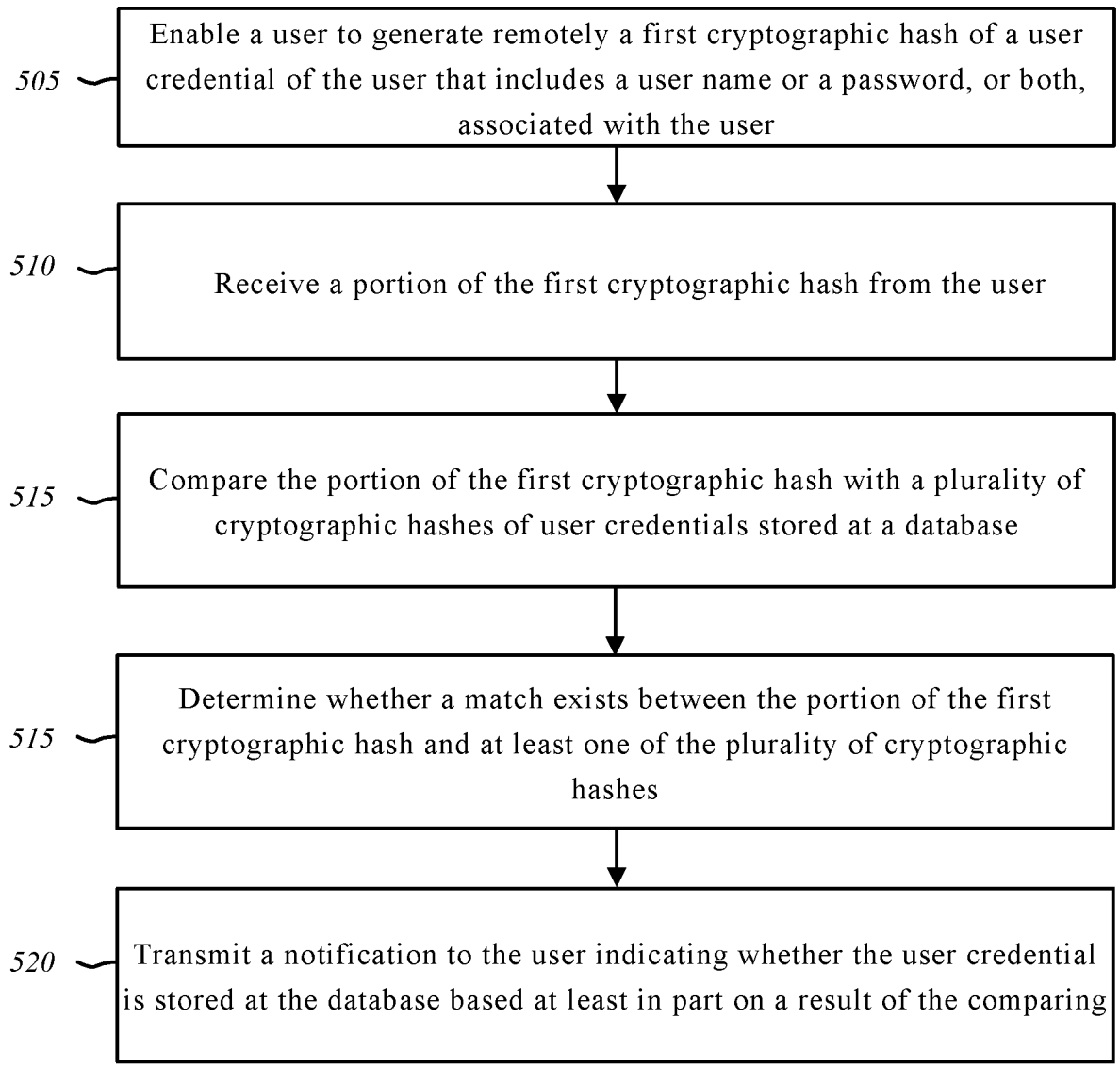
FIG. 5 is a flow diagram illustrating one embodiment of a method in accordance with various aspects of this disclosure.

FIG. 5 is a flow diagram illustrating one embodiment of a method 500 for user credential location using prefix matching. In some configurations, the method 500 may be implemented by the user credential location module 145 illustrated in FIG. 1 or 2. In some configurations, the method 500 may be implemented in conjunction with device 105, server 110, network 115, database 120, components thereof, or any combination thereof.

At block 505, the method 500 may include enabling a user to generate remotely a cryptographic hash of a user credential of the user. In some examples, the user credential may include a user name or a password, or both, associated with the user. At block 510, the method 500 may include receiving a portion of the cryptographic hash from the user. At block 515, the method 500 may include comparing the portion of the cryptographic hash with a plurality of cryptographic hashes of user credentials stored at a database.

At block 520, the method 500 may include determining whether a match exists between the portion of the cryptographic hash and at least one of the plurality of cryptographic hashes. At block 525, the method 500 may include transmitting a notification to the user indicating whether the user credential is stored at the database based at least in part on a result of the comparing.

Figure 6:
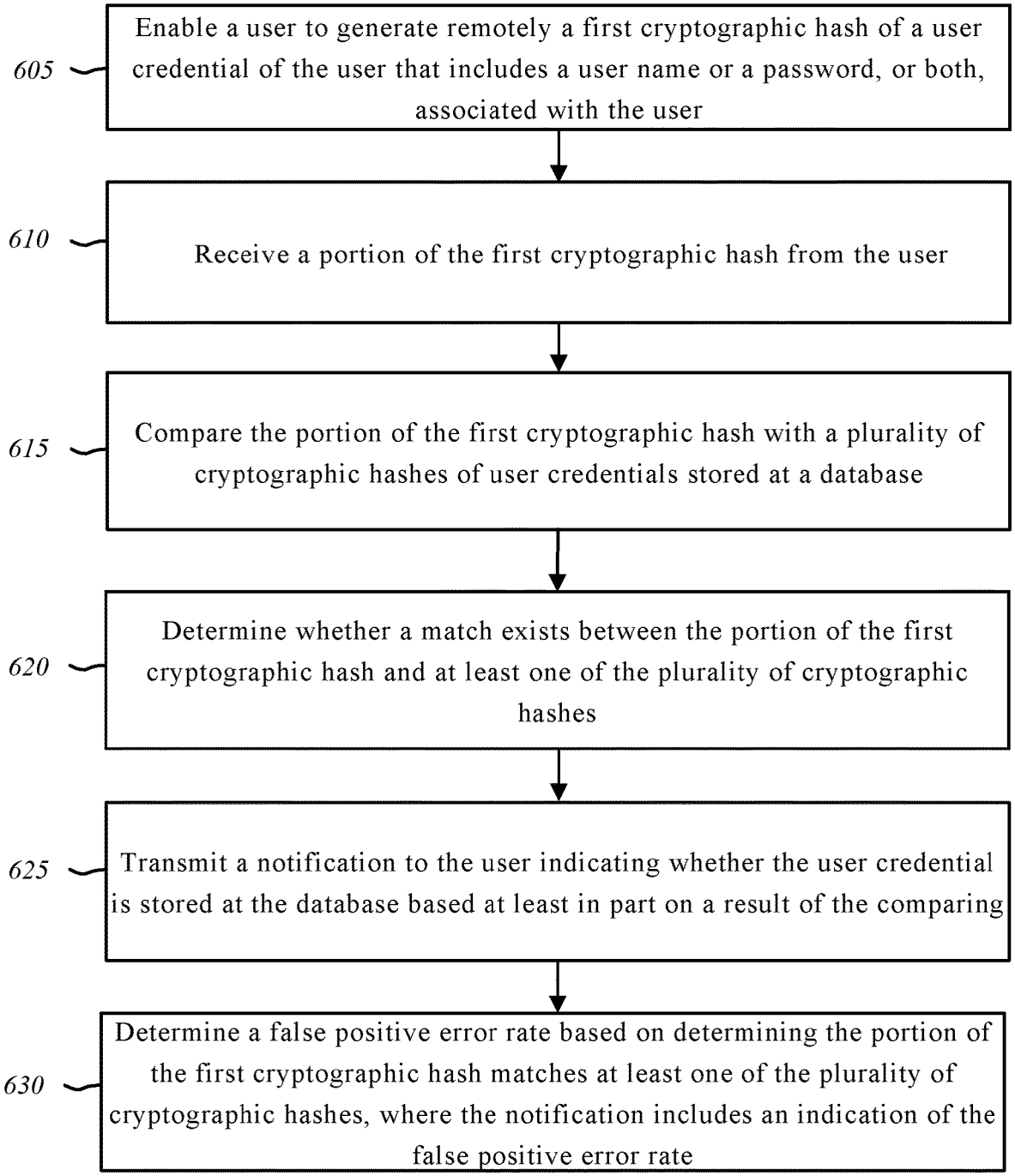
FIG. 6 is a flow diagram illustrating one embodiment of a method in accordance with various aspects of this disclosure.

FIG. 6 is a flow diagram illustrating one embodiment of a method 600 for user credential location using prefix matching. In some configurations, the method 600 may be implemented by the user credential location module 145 illustrated in FIG. 1 or 2. In some configurations, the method 600 may be implemented in conjunction with device 105, server 110, network 115, database 120, components thereof, or any combination thereof.

At block 605, the method 600 may include enabling a user to generate remotely a cryptographic hash of a user credential of the user. In some examples, the user credential may include a user name or a password, or both, associated with the user. In some examples, the cryptographic hash may include at least 128 bits. In some examples, only the user may have access to an untruncated version of the cryptographic hash.

At block 610, the method 600 may include receiving a portion of the cryptographic hash from the user. In some examples, the portion of the cryptographic hash may include a subset of a predetermined maximum number of bits for each cryptographic hash. In other examples, a size or location, or both size and location, of the portion of the cryptographic hash may be selected by the user. Additionally or alternatively, the selected portion may include at least one of a beginning portion of the cryptographic hash, a middle portion of the cryptographic hash, or an ending portion of the cryptographic hash, or any combination thereof. In some examples, the selected portion may include a non-contiguous portion of bits of the cryptographic hash. In other examples, a size or location, or both size and location, of the portion of the cryptographic hash may be selected randomly by a computing device.

At block 615, the method 600 may include comparing the portion of the cryptographic hash with a plurality of cryptographic hashes of user credentials stored at a database. In some examples, each of the plurality of cryptographic hashes of user credentials stored at the database may include at least 129-bits.

At block 620, the method 600 may include determining whether a match exists between the portion of the cryptographic hash and at least one of the plurality of cryptographic hashes. At block 625, the method 600 may include transmitting a notification to the user indicating whether the user credential is stored at the database based at least in part on a result of the comparing.

At block 630, the method 600 may include determining a false positive error rate based at least in part on determining the portion of the cryptographic hash matches at least one of the plurality of cryptographic hashes and determining a quantity of the plurality of cryptographic hashes stored at the database. In some examples, the notification may include an indication of the false positive error rate. In other examples, the determined false positive error rate may be based at least in part on a number of bits associated with the portion of the cryptographic hash.

Figure 7:
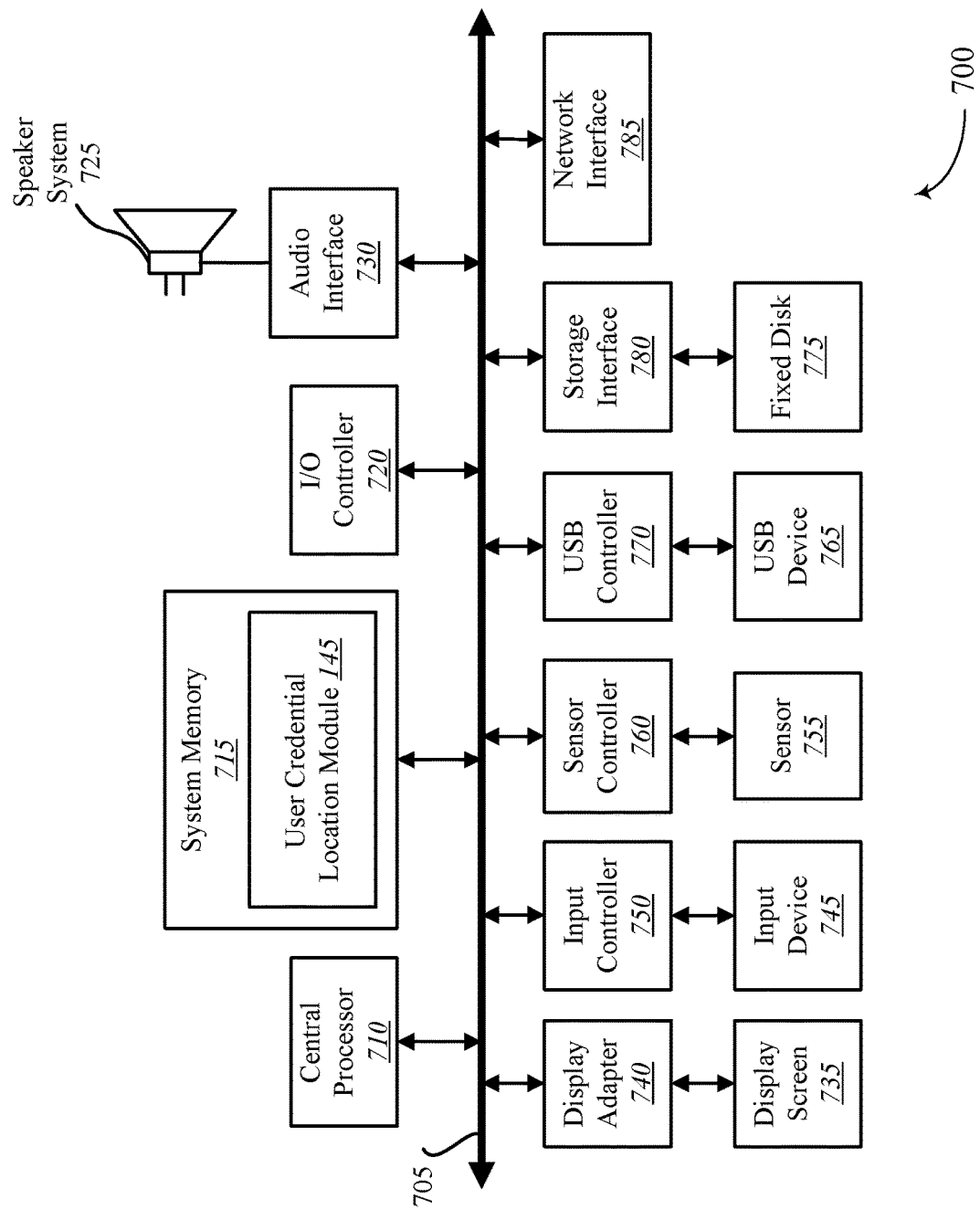
FIG. 7 depicts a block diagram of a computer system suitable for implementing the present systems and methods.

FIG. 7 depicts a block diagram of a computing device 700 suitable for implementing the present systems and methods.

The computing device 700 may be an example of device 105 and/or server 110 illustrated in FIG. 1. In one configuration, computing device 700 includes a bus 705 which interconnects major subsystems of computing device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the user credential location module 145 to implement the present systems and methods may be stored within the system memory 715. Applications (e.g., application 140) resident with computing device 700 are generally stored on and accessed via a non-transitory computer readable medium, such as a hard disk drive (e.g., fixed disk drive 775) or other storage medium. Additionally, applications can be in the form of electronic signals modulated in accordance with the application and data communication technology when accessed via network interface 785.

Storage interface 780, as with the other storage interfaces of computing device 700, can connect to a standard computer readable medium for storage and/or retrieval of information, such as a fixed disk drive 775. Fixed disk drive 775 may be a part of computing device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computing device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk drive 775. The operating system provided on computing device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computing device 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable computing device 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable computing device 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are inter-changeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for locating user credentials in databases, the method being performed by one or more computing devices with each computing device comprising at least one processor, the method comprising:

enabling a user to generate remotely a truncated length first cryptographic hash of a user credential of the user, the user credential comprising a user name or a password, or both, associated with the user;

receiving a portion of the first cryptographic hash from the user;

comparing the portion of the first cryptographic hash with each of a plurality of cryptographic hashes of user credentials stored at a database;

determining whether a match exists between the portion of the first cryptographic hash and at least one of the plurality of cryptographic hashes stored at the database;

determining a false positive error rate based at least in part on determining the portion of the first cryptographic hash matches at least one of the plurality of cryptographic hashes;

transmitting a notification to the user indicating the determined false positive error rate and whether the user credential is stored at the database based at least in part on a result of the comparing.

2. The method of claim 1, further comprising:

enabling the user to generate remotely an increased length cryptographic hash of the user credential to lower the false positive error rate; and determining a quantity of the plurality of cryptographic hashes stored at the database, wherein the notification includes an indication of the false positive error rate.

3. The method of claim 2, wherein the determined false positive error rate is based at least in part on a number of bits associated with the portion of one or more of the first cryptographic hash and the increased length cryptographic hash.

4. The method of claim 1, wherein the portion of the first cryptographic hash comprises a subset of a predetermined maximum number of bits for each cryptographic hash.

5. The method of claim 1, wherein a location of the portion of the first cryptographic hash is selected by the user.

6. The method of claim 5, wherein the selected location includes at least one of a beginning portion of the first cryptographic hash, a middle portion of the first cryptographic hash, or an ending portion of the first cryptographic hash, or any combination thereof.

7. The method of claim 1, wherein the truncated length first cryptographic hash includes a non-contiguous portion of bits of an untruncated version of the first cryptographic hash.

8. The method of claim 1, wherein a size or location, or both size and location, of the portion of the first cryptographic hash is selected randomly by a computing device.

9. The method of claim 1, wherein the first cryptographic hash and each of the plurality of cryptographic hashes comprise at least 128 bits.

10. The method of claim 1, wherein only the user has access to an untruncated version of the first cryptographic hash.

11. A computing device configured for locating user credentials in databases, comprising:

a processor;

memory in electronic communication with the processor, wherein the memory stores computer executable instructions that when executed by the processor cause the processor to perform the steps of:

enable a user to generate remotely a truncated length first cryptographic hash of a user credential of the user, the user credential comprising a user name or a password, or both, associated with the user;

receive a portion of the first cryptographic hash from the user;

compare the portion of the first cryptographic hash with each of a plurality of cryptographic hashes of user credentials stored at a database;

determine whether a match exists between the portion of the first cryptographic hash and a portion of at least one of the plurality of cryptographic hashes stored at the database;

determine a false positive error rate based at least in part on determining the portion of the first cryptographic hash matches at least one of the plurality of cryptographic hashes;

transmit a notification to the user indicating the determined false positive error rate and whether the user credential is stored at the database based at least in part on a result of the comparing.

12. The computing device of claim 11, wherein the instructions are executable by the processor to:

enable the user to generate remotely an increased length cryptographic hash of the user credential to lower the false positive error rate; and determining a quantity of the plurality of cryptographic hashes stored at the database, wherein the notification includes an indication of the false positive error rate.

13. The computing device of claim 12, wherein the determined false positive error rate is based at least in part on a number of bits associated with the portion of one or more of the first cryptographic hash and the increased length cryptographic hash.

14. The computing device of claim 11, wherein the portion of the first cryptographic hash comprises a subset of a predetermined maximum number of bits for each cryptographic hash.

15. The computing device of claim 11, wherein a location, of the portion of the first cryptographic hash is selected by the user.

16. The computing device of claim 15, wherein the selected location includes at least one of a beginning portion of the first cryptographic hash, a middle portion of the first cryptographic hash, or an ending portion of the first cryptographic hash, or any combination thereof.

17. The computing device of claim 11, wherein the truncated length first cryptographic hash includes a non-contiguous portion of bits of an untruncated version of the first cryptographic hash.

18. The computing device of claim 11, wherein a size or location, or both size and location, of the portion of the first cryptographic hash is selected randomly by the computing device.

19. The computing device of claim 11, wherein the first cryptographic hash and each of the plurality of cryptographic hashes comprise at least 128 bits.

20. A non-transitory computer-readable storage medium storing computer executable instructions that when executed by a processor cause the processor to perform the steps of:

enabling a user to generate remotely a truncated length first cryptographic hash of a user credential of the user, the user credential comprising a user name or a password, or both, associated with the user;

receiving a portion of the first cryptographic hash from the user;

comparing the portion of the first cryptographic hash with each of a plurality of cryptographic hashes of user credentials stored at a database;

determining whether a match exists between the portion of the first cryptographic hash and at least one of the plurality of cryptographic hashes stored at the database;

determining a false positive error rate based at least in part on determining the portion of the first cryptographic hash matches at least one of the plurality of cryptographic hashes;

transmitting a notification to the user indicating the determined false positive error rate and whether the user credential is stored at the database based at least in part on a result of the comparing.

* * * * *